United States Patent
Smith

(10) Patent No.: US 9,411,966 B1
(45) Date of Patent: Aug. 9, 2016

(54) CONFIDENTIAL DATA ACCESS AND STORAGE

(71) Applicant: Amazon Technologies, Inc., Reno, NV (US)

(72) Inventor: Brandon John Smith, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 77 days.

(21) Appl. No.: 13/899,310

(22) Filed: May 21, 2013

(51) Int. Cl.
*G06F 21/60* (2013.01)
*H04L 29/06* (2006.01)
*G06F 12/08* (2016.01)
*H04L 29/08* (2006.01)

(52) U.S. Cl.
CPC ............ *G06F 21/60* (2013.01); *G06F 12/0866* (2013.01); *H04L 63/0272* (2013.01); *H04L 67/1097* (2013.01)

(58) Field of Classification Search
CPC ............ G06F 12/0866; G06F 2212/24; H04L 67/1097
USPC ........................................................ 726/15
See application file for complete search history.

(56) References Cited

U.S. PATENT DOCUMENTS

| | | | | |
|---|---|---|---|---|
| 6,813,690 B1* | 11/2004 | Lango et al. | ........ | G06F 12/0866 707/999.103 |
| 7,451,250 B2* | 11/2008 | Fadell et al. | ........ | G06F 13/4022 710/27 |
| 7,930,703 B2* | 4/2011 | Jureczki et al. | .... | H04N 7/17318 380/201 |
| 8,423,511 B1* | 4/2013 | Bhatia | ................. | G06F 21/6218 707/654 |
| 2005/0023339 A1* | 2/2005 | Uno | ....................... | G06F 3/0605 235/375 |
| 2005/0109841 A1* | 5/2005 | Ryan et al. | ............ | G06F 13/385 235/380 |
| 2005/0172175 A1* | 8/2005 | Bhat et al. | ................. | H04L 1/22 714/43 |
| 2007/0008924 A1* | 1/2007 | Moran | ................. | H04L 12/4641 370/331 |
| 2010/0235545 A1* | 9/2010 | Gouraud | ............... | G06F 13/102 710/5 |
| 2011/0022812 A1* | 1/2011 | van der Linden et al. | ....................... | G06F 9/507 711/163 |
| 2011/0246766 A1* | 10/2011 | Orsini et al. | ........ | G06F 11/1076 713/160 |
| 2012/0323654 A1* | 12/2012 | Writer | .................... | G06Q 30/02 705/14.16 |

OTHER PUBLICATIONS

"SanDisk Offers RSA SecurID Two-Factor Authentication Technology Stored in Secure USB Flash Drives, Managed by SanDisk CMC Software", retrieved on Jun. 4, 2013 at <<http://www.sandisk.com/about-sandisk/press-room/press-releases/2008/2008-04-07-sandisk-offers-rsa-securid%C2%AE-two-factor-authentication-technology-stored-in-secure-usb-flash-drives,-managed-by-sandisk-cmc-software/>>, 2 pages.

* cited by examiner

*Primary Examiner* — Dao Ho
(74) *Attorney, Agent, or Firm* — Lee & Hayes, PLLC

(57) ABSTRACT

A system is described for managing storage and access of confidential data downloaded from a server (e.g., an enterprise data server) onto a mobile device. The confidential data may be received over a network directly or be embedded as part of an email or other application. Instead of storing the data item locally, the data item may be communicated to a peripheral device that is communicatively coupled to the mobile device via a peripheral interface. The data item is encrypted and stored on the peripheral device.

31 Claims, 6 Drawing Sheets

CONFIDENTIAL DATA ACCESS AND STORAGE

BACKGROUND

A smart phone or other portable electronic device may be used to download confidential data and store the confidential data locally. For example, a user may access a corporate email account via a smart phone. In some cases, an email may include confidential data (e.g., as an attachment), and the user may download the confidential data to the smart phone. The confidential data may be stored to a memory module of the smart phone or to a removable storage device. While a password may be required to access the smart phone, the confidential data may still be accessible to another user in the event that the smart phone is lost or stolen. Further, in the event that the confidential data is stored to the removable storage device, the confidential data may be accessible via another device. Accordingly, there is a need to protect such confidential data when downloaded to a mobile device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes techniques and arrangements for access to confidential data (e.g., confidential enterprise data, government data, personal data, educational data, etc.) and storage of confidential data. In some implementations, a peripheral device that is communicatively coupled to an electronic device (e.g., a smart phone) may provide additional security for confidential enterprise data. As one example, an enterprise data security application on the electronic device may disable local storage of confidential enterprise data and instead store the data in an encrypted format on the peripheral device. In some implementations, the peripheral device may provide network access security by generating a token that may be used along with one or more other credentials to authenticate a user requesting remote access to enterprise data.

As one non-limiting example, suppose that the user requests confidential enterprise data (e.g., an email attachment) from an electronic device (e.g., a smart phone) via a network (e.g., via a virtual private network). The user may be interested in downloading the confidential enterprise data to her smart phone in order to view or otherwise interact with the data. However, storing the confidential enterprise data locally may allow an unauthorized user to access the data. Further, storing the data locally on one device (e.g., on the smart phone) may prevent a user from accessing the data on another device (e.g., a tablet computing device). To address this challenge, the present disclosure describes providing secure peripheral storage and access to confidential enterprise data via a peripheral device. The peripheral device may allow the user to access confidential enterprise data and may reduce the security risk associated with local storage of the data on the electronic device.

Example Frameworks

Figure 1:
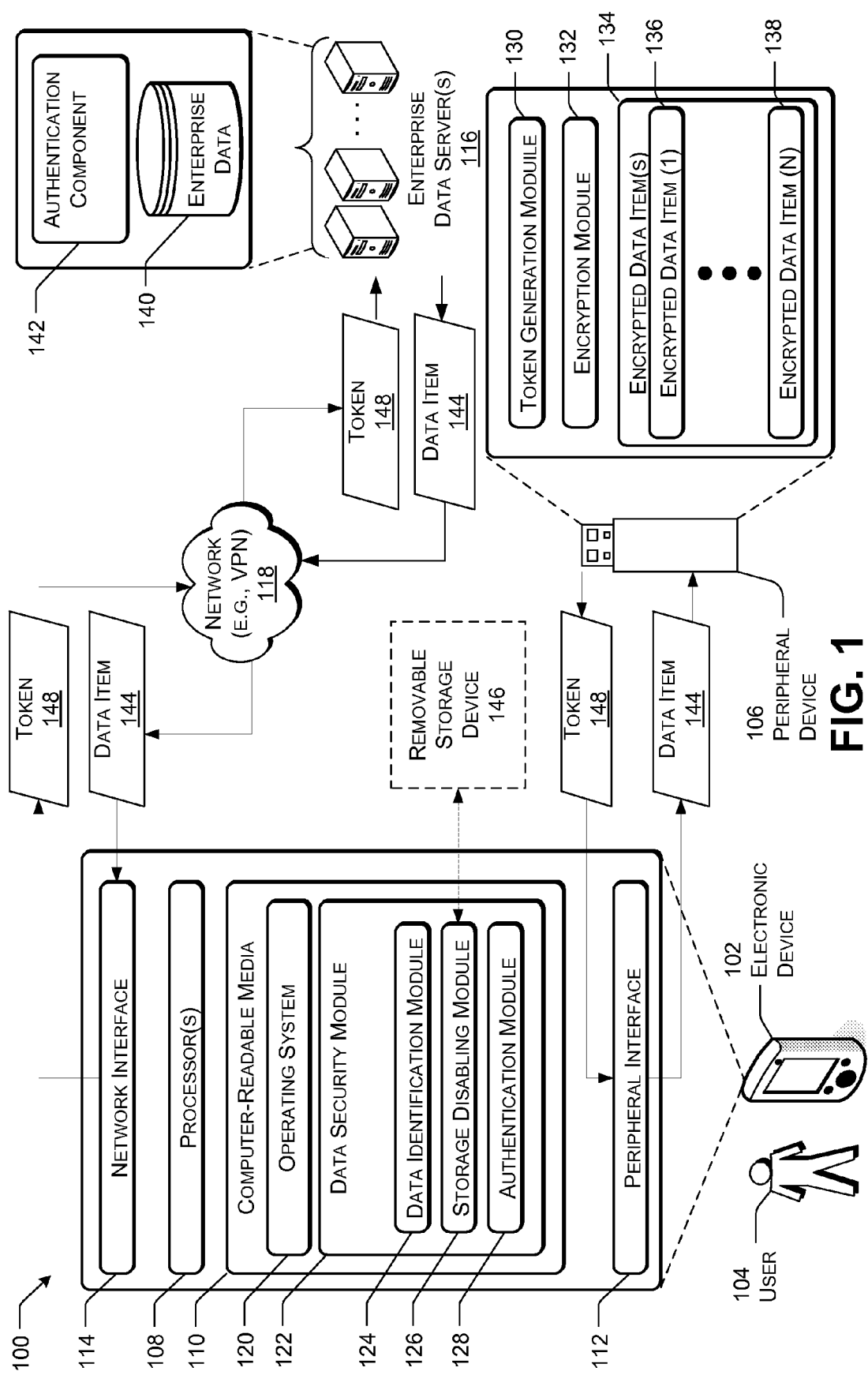
FIG. 1 illustrates an example framework for confidential data access and storage according to some implementations.

FIG. 1 illustrates an example framework 100 for securing confidential data provided to an electronic device 102 according to some implementations. In the example of FIG. 1, the data includes enterprise data. However, it will be appreciated that the data can include government data, personal data, or educational data, among other alternatives. In FIG. 1, a user 104 may communicate a request for enterprise data via the electronic device 102. When the enterprise data is determined to be confidential, the electronic device 102 may disable local storage of the confidential enterprise data. Instead, the confidential enterprise data may be stored in an encrypted format on a peripheral device 106 that is communicatively coupled to the electronic device 102. Thus, as the confidential enterprise data is not stored locally on the electronic device 102, the confidential enterprise data is inaccessible via the electronic device 102 when the peripheral device 106 is not communicatively coupled to the electronic device 102. Further, as the confidential enterprise data is stored on the peripheral device 106 in an encrypted format, the confidential enterprise data is inaccessible via another electronic device without a peripheral device key associated with the peripheral device 106.

The electronic device 102 may be implemented as any of a number of electronic devices, such as a smart phone, an eBook reader, a media player, a tablet computing device, a portable gaming device, a portable digital assistant, a laptop or netbook computer, and so forth. Furthermore, the electronic device 102 may not necessarily be a mobile or portable device, and thus, in some implementations may include a display of a desktop or other computing device, a gaming system, a television, other home electronics devices, and so forth.

In the example illustrated in FIG. 1, the electronic device 102 includes one or more processors 108, computer-readable media 110, a peripheral interface 112 and a network interface 114. The electronic device 102 may communicate with one or more enterprise data servers 116 via at least one network 118. For example, a virtual private network (VPN) connection may allow for secure communications between the electronic device 102 and the one or more enterprise data servers 116. The computer-readable media 110 may include at least an operating system 120 and a data security module 122. For example, the data security module 122 may include a data security application, illustrated in FIG. 1 as separate from the operating system 120. Alternatively, the data security module 122 may be implemented as part of the operating system 120 (e.g., at the kernel level). The data security module 122 may include a data identification module 124, a storage disabling module 126 and an authentication module 128.

The peripheral device 106 may include a token generation module 130, an encryption module 132 and one or more encrypted data items 134. In some examples, the one or more encrypted data items 134 may include multiple encrypted data items (e.g., an N number of encrypted data items). To illustrate, in FIG. 1, a first encrypted data item is identified as "Encrypted Data Item (1)" at 136, while an Nth encrypted data item is identified as "Encrypted Data Item (N)" at 138.

The one or more enterprise data servers 116 may store or otherwise have access to enterprise data 140. For example, the enterprise data 140 may include multiple data items, including one or more confidential data items. The one or more enterprise data servers 116 may also include an authentication component 142 configured to authenticate the user 104 requesting access to the one or more enterprise data servers 116 via the network 118.

In some implementations, the user 104 may communicate a request for a data item 144 to the one or more enterprise data servers 116. For example, the user 104 may communicate a request for an email to an enterprise email server, and the data item 144 may include an attachment included with the email (e.g., an attached document, spreadsheet, presentation, etc.).

The data security module 122 of the electronic device 102 may be configured to prevent local storage of confidential data items received from the one or more enterprise data servers 116. Disabling local storage may prevent unauthorized access to confidential enterprise data in the event that the electronic device 102 (or a removable storage device) is lost or stolen.

The data identification module 124 of the data security module 122 may be configured to determine whether the data item 144 is a confidential data item or otherwise includes confidential enterprise data. As one example, when the data item 144 is retrieved from the one or more enterprise data servers 116 via a VPN connection, the data identification module 124 may determine that the data item 144 is a confidential data item. As another example, the one or more enterprise data servers 116 may identify the data item 144 as a confidential data item and include a confidential data item identifier along with the data item 144 (see FIG. 2). As a further example, the one or more enterprise data servers 116 may determine a list of confidential data items included in the enterprise data 140 and may periodically synchronize this list with the electronic device 102 (see FIG. 3).

The storage disabling module 126 of the data security module 122 may be configured to disable local storage of the data item 144 on the electronic device 102 when the data item 144 is determined to be a confidential data item. For example, the storage disabling module 126 may disable storage of the data item 144 to the computer-readable media 110 of the electronic device 102. Further, in the example illustrated in FIG. 1, a removable storage device 146 (e.g., a Flash memory device) may be communicatively coupled to the electronic device 102. In this case, the storage disabling module 126 may also disable storage of the data item 144 to the removable storage device 146. Disabling local storage of the data item 144 to the computer-readable media 110 of the electronic device 102 may prevent unauthorized access to confidential enterprise data in the event that the electronic device 102 is lost or stolen. Further, disabling local storage of the data item 144 to the removable storage device 146 may prevent unauthorized access to confidential enterprise data in the event that the removable storage device 146 is lost or stolen.

Instead of storing the data item 144 at the electronic device 102, the data security module 122 may be configured to communicate the data item 144 to the peripheral device 106 via the peripheral interface 112 for encryption and storage on the peripheral device 106. In the example illustrated in FIG. 1, the peripheral device 106 includes a universal serial bus (USB) device. In this case, the peripheral interface 112 may include a USB device interface, and the peripheral device 106 may be physically coupled to the electronic device 102 via the USB device interface. Alternatively, the peripheral device 106 may include an external storage device other than a USB device, and the peripheral device 106 may be communicatively coupled to the electronic device 102 in an alternative manner. For example, the peripheral device 106 may include a storage device that may be communicatively coupled to the electronic device 102 via an audio interface (e.g., a headphone jack) or via a wireless interface (e.g., via a WiFi connection, a Bluetooth® connection, etc.), among other alternatives.

The encryption module 132 of the peripheral device 106 may be configured to encrypt the data item 144 received from the electronic device 102. Alternatively, the data item 144 may be encrypted by the operating system 120 of the electronic device 102 or by a separate encryption component (not shown in FIG. 1) that may be stored on the electronic device 102. Further, in some examples, one or more encryption operations may be performed via the electronic device 102 and one or more encryption operations may be performed via the peripheral device 106. Thus, while FIG. 1 illustrates that the encryption module 132 is stored on the peripheral device 106, it will be appreciated that encryption may be performed by the peripheral device 106, the electronic device 102, or a combination thereof. After being encrypted, the data item 144 may be stored on the peripheral device 106 as an encrypted data item (e.g., stored as the first encrypted data item 136 of the one or more encrypted data items 134). Thus, if the peripheral device 106 is lost or stolen, the encrypted confidential enterprise data may be inaccessible without a peripheral device key (see FIG. 4).

In some examples, the peripheral device 106 may provide multiple forms of security. For example, in addition to providing data storage security via the encryption module 132, the token generation module 130 may provide network access security. To illustrate, the token generation module 130 may be configured to generate the token 148 and communicate the token 148 to the electronic device 102 via the peripheral interface 112. In some examples, in order to access the one or more enterprise data servers 116 via the network 118 (e.g., via a VPN connection), the authentication module 128 may communicate the token 148 and one or more other credentials (e.g., a username, a password, etc.) received from the user 104 to the one or more enterprise data servers 116 via the network interface 114. In some implementations, the authentication component 142 of the one or more enterprise data servers 116 may authenticate the user 104 based on the token 148 and the one or more other credentials received from the user 104. After the authentication component 142 authenticates the user 104, the one or more enterprise data servers 116 may communicate the data item 144 to the electronic device 102 via the network 118.

Thus, FIG. 1 illustrates that disabling local storage of confidential enterprise data to the electronic device 102 (e.g., to the computer-readable media 110 or to the removable storage device 146) may prevent unauthorized access to confidential enterprise data in the event that the electronic device 102 or the removable storage device 146 is lost or stolen. Instead, the data security module 122 communicates the confidential enterprise data to the peripheral device 106 for storage as an encrypted data item. FIG. 1 further illustrates that the peripheral device 106 may provide network access security by generating the token 148 to be communicated to the one or more enterprise data servers 116 via the network interface 114 of the electronic device 102. The one or more enterprise data servers 116 may utilize the token 148 and one or more other credentials received from the user 104 to authenticate the user 104.

Figure 2:
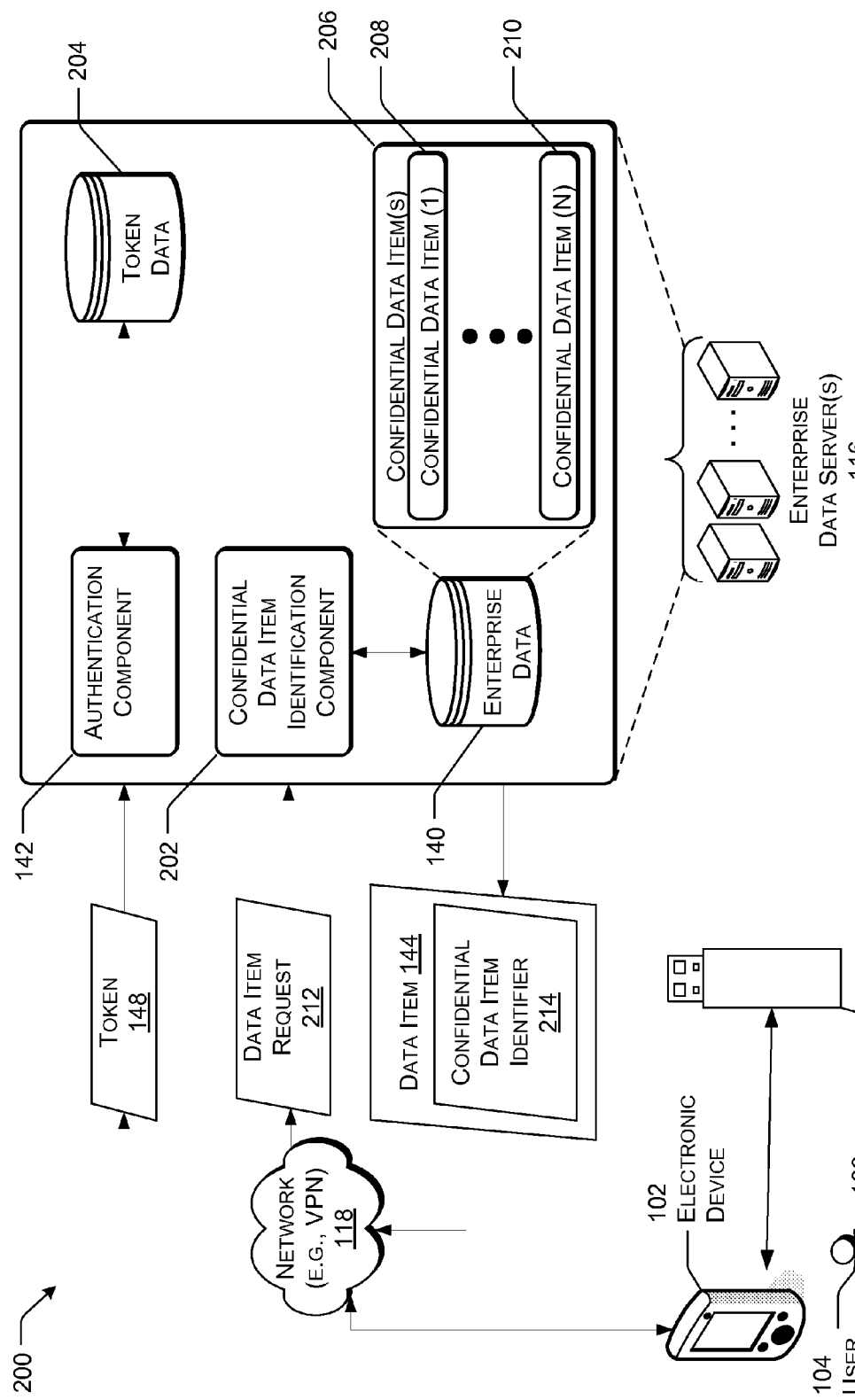
FIG. 2 illustrates an example framework for authenticating a user and determining whether a requested data item includes confidential data according to some implementations.

FIG. 2 illustrates an example framework 200 for authenticating the user 104 and determining whether the data item 144 requested by the user 104 includes confidential enterprise data. In the example of FIG. 2, the one or more enterprise data servers 116 may maintain a list of confidential data items that include confidential enterprise data. When the one or more enterprise data servers 116 determine that the data item 144 is a confidential data item, the one or more enterprise data servers 116 may indicate to the electronic device 102 that the data item 144 includes confidential enterprise data to be encrypted and stored on the peripheral device 106.

In the example illustrated in FIG. 2, the one or more enterprise data servers 116 include a confidential data item identification component 202, the enterprise data 140, the authentication component 142 and token data 204. The enterprise data 140 may include one or more confidential data items 206. In some examples, the one or more confidential data items 206 may include multiple confidential data items (e.g., an N number of confidential data items). To illustrate, in FIG. 2, a first confidential data item is identified as "Confidential Data Item (1)" at 208, while an Nth confidential data item is identified as "Confidential Data Item (N)" at 210.

In some implementations, the authentication component 142 may determine whether the token 148 received from the electronic device 102 is valid based on the token data 204. For example, the authentication component 142 may determine whether the token 148 received from the electronic device 102 is associated with the peripheral device 106. Further, the enterprise authentication component 142 may authenticate the user 104 based on one or more other credentials received from the user 104. In some examples, a VPN connection may be established between the electronic device 102 and the one or more enterprise data servers 116 in response to the user 104 being authenticated.

The one or more enterprise data servers 116 may be configured to receive a data item request 212 from the electronic device 102 via the network 118 (e.g., via a VPN connection established in response to the authentication component 142 authenticating the user 104). The confidential data item identification component 202 may be configured to determine whether the data item 144 associated with the data item request 212 includes confidential enterprise data. For example, the confidential data identification component 202 may determine whether the data item 144 is one of the confidential data items 206. To illustrate, the confidential data item identification component 202 may access the enterprise data 140 and determine that the data item 144 is the first confidential data item 208. In response to determining that the data item 144 is a confidential data item, the one or more enterprise data servers 116 may communicate a confidential data item identifier 214 (e.g., along with the data item 144) to the electronic device 102.

The confidential data item identifier 214 may indicate to the data security module 122 of the electronic device 102 that the data item 144 includes confidential enterprise data and is to be encrypted and stored to the peripheral device 106 and not stored on the electronic device 102 or the removable storage device 146.

Figure 3:
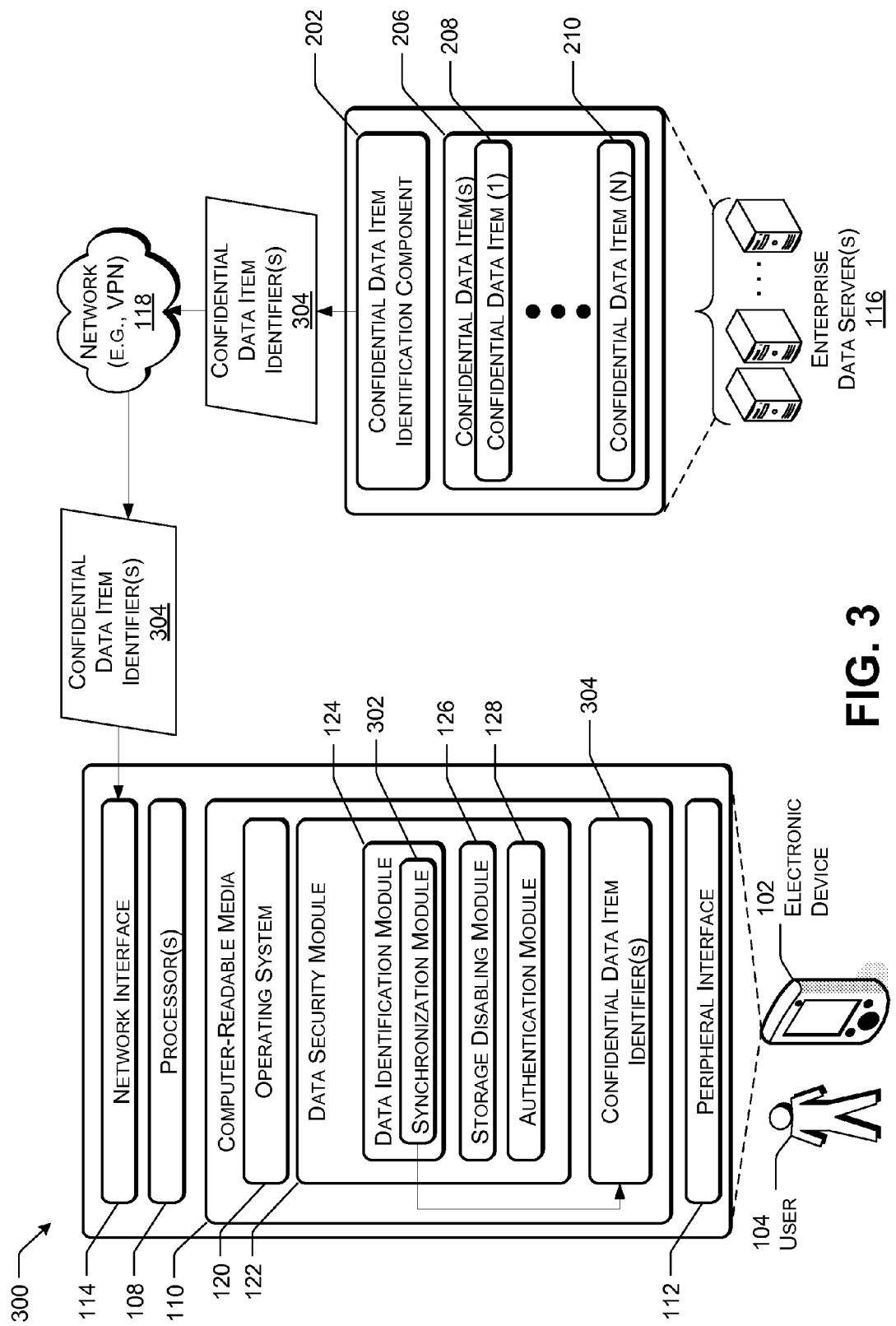
FIG. 3 illustrates an example framework for identifying confidential data according to some implementations.

FIG. 3 illustrates an example framework 300 for identifying confidential enterprise data based on information stored on the electronic device 102. In the example of FIG. 3, the one or more enterprise data servers 116 may identify the one or more confidential data items 206 that include confidential enterprise data and may provide information identifying the one or more confidential data items 206 to the electronic device 102. Thus, the electronic device 102 may determine whether the data item 144 includes confidential enterprise data based on a list of confidential data item identifiers 304 stored on the electronic device 102.

In the example illustrated in FIG. 3, the data security module 122 of the electronic device 102 further includes a synchronization module 302. The synchronization module 302 may be configured to store one or more confidential data item identifiers 304 received from the one or more enterprise data servers 116. In some examples, the data identification module 124 may determine whether the data item 144 includes confidential enterprise data based on the one or more confidential data item identifiers 304 stored on the electronic device 102.

In some implementations, a different confidential data item identifier may be associated with each confidential data item of the one or more confidential data items 206. For example, a first confidential data item identifier may be associated with the first confidential data item 208, and an Nth confidential data item identifier may be associated with the Nth confidential data item 210. To illustrate, referring to FIG. 2, the data item 144 may represent the first confidential data item 208, and the confidential data item identifier 214 may represent a confidential data item identifier associated with the first confidential data item 208.

In some implementations, the confidential data item identification component 202 may determine whether the one or more confidential data items 206 have changed. For example, the confidential data item identification component 202 may periodically access the enterprise data 140 to determine whether one or more confidential data items have been added to the enterprise data 140 or removed from the enterprise data 140. As another example, the one or more confidential data items 206 may be automatically updated in response to one or more confidential data items being added to the enterprise data 140 or removed from the enterprise data 140. In some implementations, an updated list of the one or more confidential data item identifiers 304 may be communicated to the electronic device 102 in response to determining that the one or more confidential data items 206 have changed. In response, the synchronization module 302 of the electronic device 102 may store the updated list of the one or more confidential data item identifiers 304.

Thus, FIG. 3 illustrates that the electronic device 102 may determine whether the data item 144 includes confidential enterprise data based on a list of confidential data items stored on the electronic device 102. That is, in contrast to the example illustrated in FIG. 2, the one or more enterprise data servers 116 may not provide the confidential data item identifier 214 in response to the data item request 212, as the electronic device 102 may locally determine whether the data item 144 requested by the user 104 includes confidential enterprise data.

Figure 4:
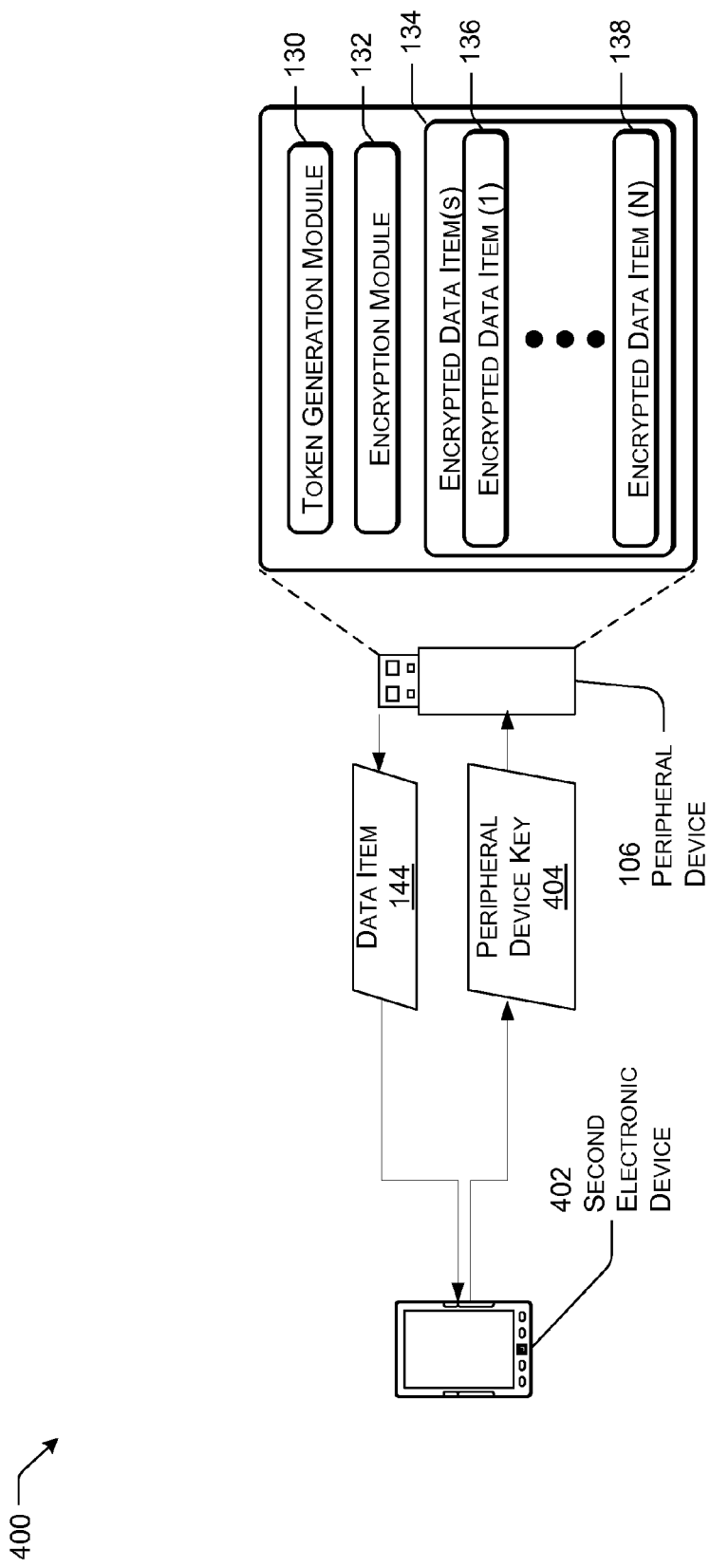
FIG. 4 illustrates an example process of accessing confidential data stored on a peripheral device according to some implementations.

FIG. 4 illustrates an example process 400 of accessing confidential enterprise data stored on the peripheral device 106 using a second electronic device 402. Storing confidential enterprise data on the peripheral device 106 instead of the electronic device 102 may provide additional security for the confidential enterprise data and may allow a user to access the confidential enterprise data via the second electronic device 402.

In some implementations, the data item 144 may be received via the electronic device 102 when the peripheral device 106 is communicatively coupled to the electronic device 102 via the peripheral interface 112 and may be stored on the peripheral device 106 as the first encrypted data item 136. When the peripheral device 106 is no longer communicatively coupled to the electronic device 102, the data item 144 may be inaccessible to the electronic device 102, as the data item 144 was not stored locally on the electronic device 102 (e.g., on the computer-readable media 110 or on the removable storage device 146).

In the example of FIG. 4, the peripheral device 106 is communicatively coupled to the second electronic device 402. A peripheral device key 404 may be provided to the peripheral device 106 via the second electronic device 402 in order to access the confidential enterprise data that was stored on the peripheral device 106 when the peripheral device 106 was communicatively coupled to the electronic device 102.

Thus, FIG. 4 illustrates that, by storing a confidential data item received via one electronic device (e.g., the electronic device 102) on the peripheral device 106 as an encrypted data item, confidential enterprise data may be inaccessible via the second electronic device 402 without the peripheral device key 404 in the event that the peripheral device 106 is lost or stolen. Further, by storing information on the peripheral device 106 rather than the electronic device 102, the user 104 may access the confidential enterprise data stored on the peripheral device 106 via another device (e.g., the second device 402).

Example Electronic Device

Figure 5:
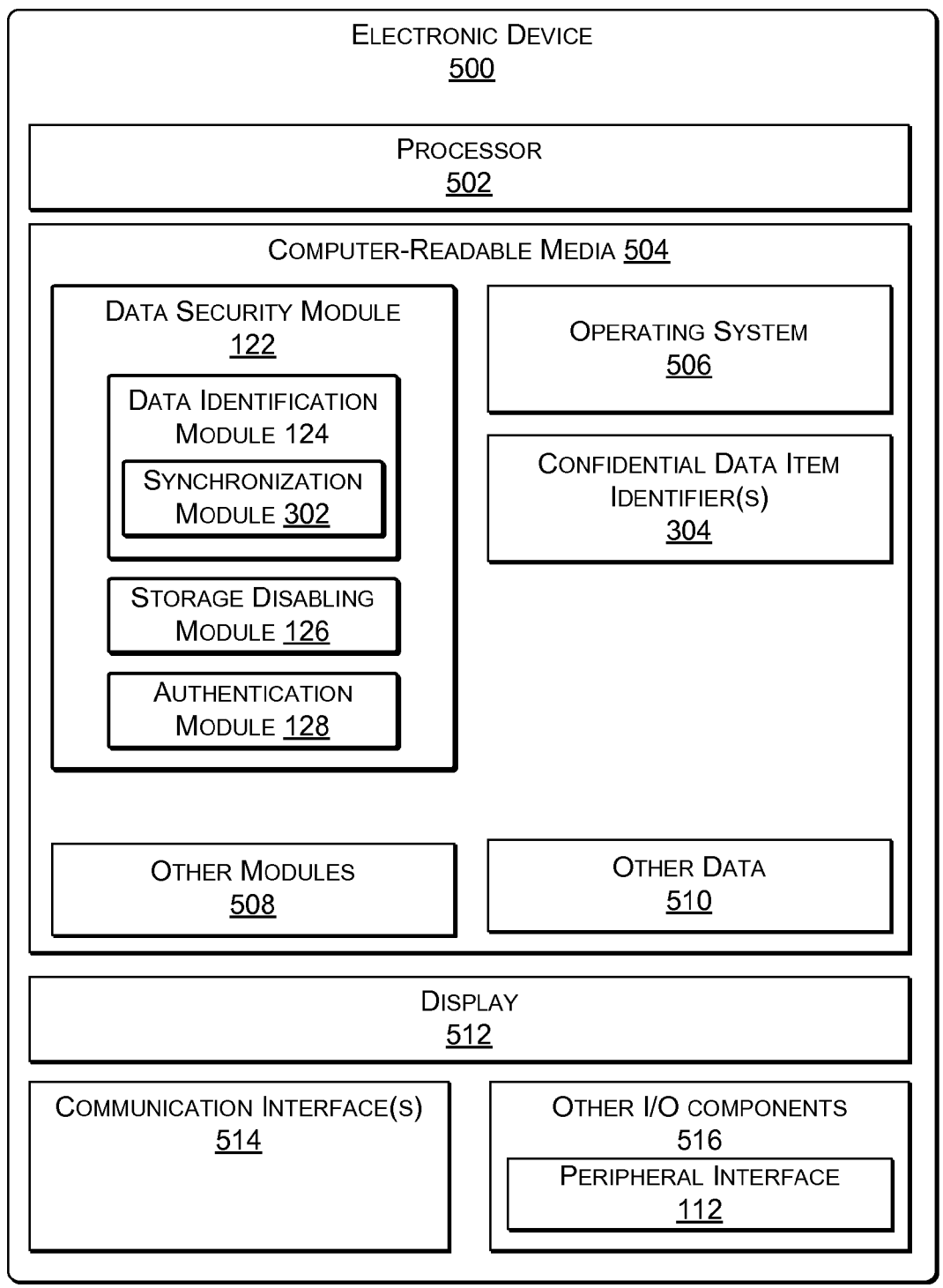
FIG. 5 illustrates select components of an example electronic device according to some implementations.

FIG. 5 illustrates select example components of an electronic device 500 (e.g., the electronic device 102 of FIGS. 1-3) that may be used to implement the functionality described above according to some implementations. In a very basic configuration, the electronic device 500 includes, or accesses, components such as at least one processor 502 and a computer-readable media 504. Each processor 502 may itself comprise one or more processors or cores. The processor(s) 502 can be configured to fetch and execute computer-readable instructions stored in the computer-readable media 504 or other computer-readable media.

Depending on the configuration of the electronic device 500, the computer-readable media 504 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 502 directly or through another computing device. Accordingly, the computer-readable media 504 may be computer-readable media able to maintain instructions, modules or components executable by the processor 502.

The computer-readable media 504 may be used to store any number of functional components that are executable by the processor 502. In some implementations, these functional components comprise instructions or programs that are executable by the processor 502 and that, when executed, implement operational logic for performing the actions attributed above to the electronic device 500. Functional components of the electronic device 500 stored in the computer-readable media 504 may include the data security module 122, as described above, which may be executed on the processor 502 for providing access to confidential enterprise data and preventing local storage of the confidential enterprise data. Additional functional components associated with the data security module 122 stored in the computer-readable media 504 may include the data identification module 124, the storage disabling module 126, and the authentication module 128. In some examples, the data identification module 124 may also include the synchronization module 302 (illustrated in FIG. 3). Other functional components may include an operating system 506 for controlling and managing various functions of the electronic device 500. In some examples, the operating system 506 may correspond to the operating system 120 of FIGS. 1-3. In some examples, at least a portion of the functionality of the data security module 122 may be incorporated into the operating system 120 (e.g., at the kernel level). Depending on the type of the electronic device 500, the computer-readable media 504 may also optionally include other functional components, such as other modules 508, which may include applications, programs, drivers and so forth.

The computer-readable media 504 may also store data, data structures, and the like that are used by the functional components. For example, data stored by the computer-readable media 504 may include the one or more confidential data item identifiers 304 illustrated in FIG. 3. The electronic device 500 may also include other data 510, which may include, for example, data used by the operating system 506 and the other modules 508. Further, the electronic device 500 may include many other logical, programmatic and physical components, of which those described are merely examples that are related to the discussion herein.

FIG. 5 further illustrates a display 512, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 512 may be an active display such as a liquid crystal display, plasma display, light emitting diode display, organic light emitting diode display, and so forth. These displays may comprise drive electronics, such as a display drive matrix configured to affect individual pixels within the display 512. Additionally, in some implementations, the display 512 may be a 3D display capable of providing a 3D image. For example, the display 512 may produce a 3D image by providing alternating left-eye and right-eye images with or without the use of shuttering or filtering eyeglasses. Accordingly, in some implementations, the visual representations and other user interface components herein may be rendered in 3D.

In some implementations, multiple displays 512 may be present on the electronic device 500. When multiple displays are present, these displays may be of the same or different types. For convenience only, the display 512 of the computing device 102 is shown in a generally rectangular configuration. However, it is understood that the display 512 may be implemented in any shape, and may have any ratio of height to width. Also, for stylistic or design purposes, the display 512 may be curved or otherwise non-linearly shaped. Furthermore, the display 512 may be flexible and configured to fold or roll.

One or more communication interfaces 514 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 514 may allow a user of the electronic device 102 of FIGS. 1-3 to access the World Wide Web, provide the token 148 to the one or more enterprise data servers 116 (e.g., via a VPN connection), and download the data item 144, and the like. The communication interface 514 may further allow a user to access storage on another device, such as a user's computing device, a network attached storage device, or the like.

The electronic device 500 may further be equipped with various other input/output (I/O) components 516. Such I/O components may include a touchscreen and various user actuatable controls (e.g., buttons, a joystick, a keyboard, a mouse, etc.), speakers, a microphone, a camera, connection ports, and so forth. For example, the electronic device 500 may include the peripheral interface 112 to communicate with the peripheral device 106. As another example, the operating system 506 of the electronic device 500 may include suitable drivers configured to accept input from a keypad, keyboard, or other user actuatable controls and devices included as the I/O components 516. For instance, the user actuatable controls may include page turning buttons, navigational keys, a power on/off button, selection keys, and so on. Additionally, the electronic device 500 may include various other components that are not shown, examples of which include removable storage, a power source, such as a battery and power control unit, a global positioning system (GPS) device, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 6:
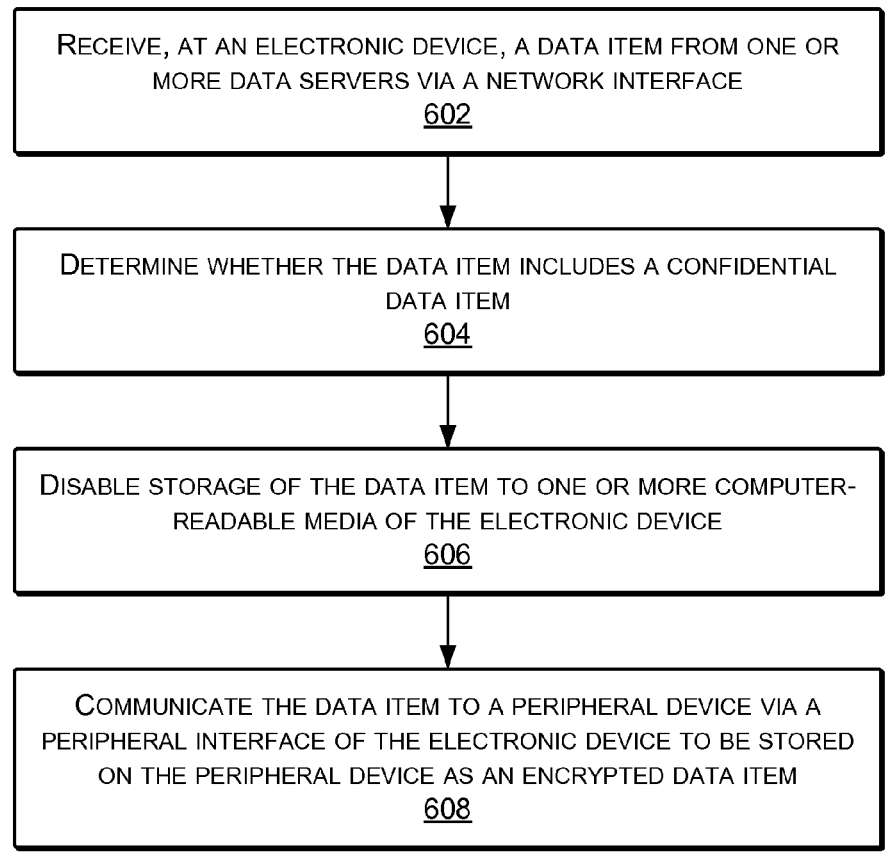
FIG. 6 is a flow diagram illustrating an example process executed by an electronic device for confidential data access and storage according to some implementations.

FIG. 6 illustrates an example process 600 for disabling local storage of a data item, as described above. The process 600 is illustrated as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

At 602, an electronic device receives a data item from one or more data servers (e.g., enterprise data servers) via a network interface. As an illustrative example, referring to FIG. 1, the electronic device 102 may receive the data item 144 from the one or more enterprise data servers 116 via the network interface 114.

In some implementations, the peripheral device 106 may provide additional network access security via the token 148. To illustrate, the electronic device 102 may receive the token 148 from the peripheral device 106 via the peripheral interface 112. In some examples, the user 104 may provide one or more other credentials (e.g., a username, a password, etc.). In some examples, the electronic device 102 may communicate the token 148 and the one or more other credentials to the one or more enterprise data servers 116 in order to establish a VPN connection. In some implementations, the storage disabling module 126 may automatically disable local storage of the data item 144 in response to determining that the VPN connection has been established.

In the example illustrated in FIG. 6, the electronic device 102 may determine whether the data item 144 includes a confidential data item, at 604. The electronic device 102 may disable local storage of the data item 144 in response to determining that the data item 144 includes confidential data. As an illustrative example, referring to FIG. 2, the one or more enterprise data servers 116 may include the confidential data item identifier 214 along with the data item 144 in response to the data item request 212 received from the user 104. In this case, the data item 144 may be identified as including confidential enterprise data based on the confidential data item identifier 214. As another example, referring to FIG. 3, the one or more enterprise data servers 116 may provide the list of confidential data item identifiers 304 to the electronic device 102, and the electronic device 102 may store the list of confidential data item identifiers 304. In this case, the electronic device 102 may determine that the data item 144 includes confidential enterprise data when the data item 144 is included in the list of confidential data item identifiers 304. Further, in some examples, the list of confidential data item identifiers 304 may be updated by the one or more enterprise data servers 116, and the updated list may be sent to the electronic device 102.

At 606, the electronic device 102 disables storage of the received data item 144 to the one or more computer-readable media 110 of the electronic device 102. In some implementations, a removable storage device (e.g., the removable storage device 146) may be communicatively coupled to the electronic device 102 via a removable storage device interface. In some examples, the electronic device 102 may further disable storage of the received data item 144 to the removable storage device 146.

At 608, the electronic device 102 communicates the data item 144 to the peripheral device 106 via the peripheral interface 112 to be stored on the peripheral device 106 as an encrypted data item (e.g., as the first encrypted data item 136).

In some implementations, after communicating the data item 144 to the peripheral device 106, the user 104 may request access to the data item 144 via the electronic device 102. In response to the request, the electronic device 102 may determine whether the peripheral device 106 is communicatively coupled to the electronic device 102 via the peripheral interface 116. When the peripheral device 106 is communicatively coupled to the electronic device 102, the data item 144 may be accessible to the user 104 via the electronic device 102. Further, a second encrypted data item (e.g., the Nth encrypted data item 138) stored on the peripheral device 106 may be accessible when the peripheral device 106 is communicatively coupled to the electronic device 102. When the peripheral device 106 is not communicatively coupled to the electronic device 102 via the peripheral interface 116, the request from the user 104 may be denied and the data item 144 may be inaccessible via the electronic device 102.

In some implementations, the peripheral device 106 may be decoupled from the electronic device 102 after the data item 144 has been encrypted and stored to the peripheral device 106. To illustrate, referring to FIG. 4, the peripheral device 106 has been decoupled from the electronic device 102. In order to access the one or more encrypted data items 134 stored on the peripheral device 106 via the second electronic device 402, the peripheral device key 404 may be used. This may allow the user 104 to access the one or more encrypted data items 134 via another device (e.g., a tablet computing device). Further, without the peripheral device key 404, an unauthorized user may be unable to access the one or more encrypted data items 134 via another device.

Thus, FIG. 6 illustrates that disabling local storage of the data item 144 to the electronic device 102 may prevent access to confidential enterprise data when the peripheral device 106 is not communicatively coupled to the electronic device 102. Further, the peripheral device 106 may provide additional network security by generating the token 148 to be used in establishing a VPN connection.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
   one or more processors;
   one or more internal computer-readable media;
   an internal removable storage device interface to communicatively couple an internal removable storage device to the electronic device;
   a network interface;
   a peripheral interface to communicatively couple a peripheral device to the electronic device;
   a data security module maintained on the one or more computer-readable media and executed on the one or more processors to perform operations that include:
   receiving a data item from one or more data servers via the network interface, wherein receiving the data item includes receiving a confidential identifier that indicates that the data item contains confidential data;
   determining that the peripheral device is communicatively coupled to the electronic device via the peripheral interface;
   receiving a token from the peripheral device via the peripheral interface;
   receiving credential data representing one or more credentials from a user input device associated with the electronic device;
   sending the token and the credential data to the one or more data servers to establish a virtual private network (VPN) connection with the electronic device and the one or more data servers;
   automatically disabling storage of the data item to at least one of:
   the one or more internal computer-readable media; or
   the internal removable storage device; and
   sending the data item to the peripheral device to be stored on the peripheral device.

2. The electronic device as recited in claim 1, wherein the data security module further performs operations that include:
   receiving a request to access the data item via the electronic device after communicating the data item to the peripheral device; and
   based at least partly on the determining that the peripheral device is communicatively coupled to the electronic device via the peripheral interface, receiving the data item from the peripheral device.

3. The electronic device as recited in claim 2, wherein the data security module further performs operations that include denying the request to access the data item based at least partly on a determination that the peripheral device is not communicatively coupled to the electronic device via the peripheral interface.

4. The electronic device as recited in claim 1, wherein:
   the data security module is included as part of an operating system of the electronic device or is stored on the one or more computer-readable media as a data security application that is separate from the operating system; and
   the data security module determines that the data item includes confidential data by determining that an attachment to an electronic mail message includes the confidential data.

5. The electronic device as recited in claim 1, wherein the peripheral interface includes a wireless interface.

6. A method comprising:
   under control of one or more processors of an electronic device specifically configured with executable instructions,
   receiving confidential identifiers from one or more data servers via a network interface of the electronic device;
   receiving a data item from the one or more data servers;
   determining that the data item includes confidential data based at least partly on a determination that a confidential identifier is associated with the data item;
   receiving a token from a peripheral device communicatively coupled to the electronic device via a peripheral interface of the electronic device;
   receiving credential data representing one or more credentials from a user input device associated with the electronic device;

sending the token and the credential data to the one or more data servers to establish a virtual private network (VPN) connection with the electronic device and the one or more data servers;

disabling storage of the data item to one or more internal computer-readable media of the electronic device; and sending the data item to the peripheral device to be stored on the peripheral device.

7. The method as recited in claim 6, further comprising disabling storage of the data item to an internal removable storage device communicatively coupled to the electronic device via a removable storage device interface.

8. The method as recited in claim 6, wherein the one or more credentials include at least one of a username or a password.

9. The method as recited in claim 6, further comprising:
receiving an updated list of confidential identifiers from the one or more data servers; and
determining that the data item includes confidential data based at least partly on a determination that the confidential identifier associated with the data item is included in the updated list of confidential identifiers,
wherein storage of the data item to the one or more computer-readable media of the electronic device is disabled in response to determining that the data item includes confidential data.

10. The method as recited in claim 6, wherein the electronic device includes a smart phone.

11. The method as recited in claim 6, wherein determining that the data item includes confidential data is based at least partly on a determination that the data item is an attachment to an email message.

12. The method as recited in claim 6, wherein the token is generated by a token generation module stored on the peripheral device.

13. The method as recited in claim 6, further comprising encrypting the data item prior to sending the data item to the peripheral device.

14. The method as recited in claim 6, further comprising encrypting, by an encryption module stored on the peripheral device, the data item after it is stored on the peripheral device.

15. A system comprising:
one or more processors;
one or more internal computer-readable media;
a network interface;
a peripheral interface;
a storage disabling module maintained on the one or more computer-readable media and executed on the one or more processors to perform operations that include:
receiving a data item from one or more data servers via the network interface;
receiving a confidential data identifier that indicates that the data item includes confidential information;
receiving a token from a peripheral device via the peripheral interface;
receiving credential data representing one or more credentials from a user input device;
sending the token and the credential data via the network interface to the one or more data servers to establish a virtual private network (VPN) connection with the network interface and the one or more data servers;
disabling storage of the data item to the one or more internal computer-readable media; and
sending the data item to the peripheral device to be stored on the peripheral device.

16. The system as recited in claim 15, wherein the one or more credentials include at least one of a username or a password.

17. The system as recited in claim 15, wherein the storage disabling module automatically disables storage of the data item to the one or more computer-readable media of the electronic device in response to determining that the VPN connection has been established.

18. The system as recited in claim 15, wherein the peripheral interface includes a universal serial bus (USB) device interface.

19. The system as recited in claim 15, wherein the peripheral interface includes a wireless interface.

20. The system as recited in claim 15, wherein the peripheral interface includes an audio interface.

21. The system as recited in claim 15, further comprising a removable storage device interface to communicate with a removable storage device, wherein the storage disabling module is further configured to disable storage of the data item to the removable storage device.

22. The system as recited in claim 15, further comprising:
a data identification module maintained on the one or more computer-readable media and executed on the one or more processors to perform operations that include determining that the data item includes confidential information,
wherein the storage disabling module disables storage of the data item in response to the data identification module determining that the data item includes confidential information.

23. The system as recited in claim 15, further comprising the peripheral device, wherein the peripheral device is communicatively coupled to the peripheral interface.

24. The system as recited in claim 23, wherein the peripheral device comprises:
internal computer-readable media; and
a token generation module maintained on the internal computer-readable media and having instructions that when executed by the one or more processors, cause the peripheral device to generate the token at least partly in response to being communicatively coupled to the peripheral interface.

25. The system as recited in claim 15, wherein the data item is an attachment to an email message.

26. The system as recited in claim 15, wherein the operations further comprise encrypting the data item.

27. One or more non-transitory computer-readable media maintaining instructions executable by one or more processors to perform operations comprising:
receiving a data item from one or more data servers;
receiving a confidential identifier from the one or more data servers;
receiving a token from a peripheral device via a peripheral interface;
receiving credential data representing one or more credentials from a user input device;
sending the token and the credential data to the one or more data servers to establish a virtual private network (VPN) connection with the one or more data servers;
disabling storage of the data item to at least one or more internal computer-readable media based at least in part on a determination that the confidential identifier indicates that the data item contains confidential data; and
sending the data item to a peripheral device via the peripheral interface, the data item to be stored on the peripheral device.

28. The non-transitory computer-readable media as recited in claim 27, wherein storage of the data item to at least the one or more internal computer-readable media is automatically disabled in response to determining that the VPN connection has been established.

29. The non-transitory computer-readable media as recited in claim 27, the operations further comprising disabling storage of the data item to a removable storage device via a removable storage device interface.

30. The electronic device as recited in claim 29, wherein automatically disabling storage of the data item to at least one of the one or more internal computer-readable media or the internal removable storage device is in response to determining that the virtual private network (VPN) connection has been established.

31. The system as recited in claim 27, wherein receiving the confidential data identifier includes receiving a list of confidential data item identifiers.

\* \* \* \* \*